United States Patent
Burkey et al.

(10) Patent No.: US 7,406,578 B2
(45) Date of Patent: Jul. 29, 2008

(54) METHOD, APPARATUS AND PROGRAM STORAGE DEVICE FOR PROVIDING VIRTUAL DISK SERVICE (VDS) HINTS BASED STORAGE

(75) Inventors: Todd R. Burkey, Savage, MN (US); Fumin Zhang, Eden Prairie, MN (US)

(73) Assignee: Xiotech Corporation, Eden Prairie, MN (US)

( * ) Notice: Subject to any disclaimer, the term of this patent is extended or adjusted under 35 U.S.C. 154(b) by 289 days.

(21) Appl. No.: 11/241,176

(22) Filed: Sep. 30, 2005

(65) Prior Publication Data

US 2007/0079060 A1    Apr. 5, 2007

(51) Int. Cl.
*G06F 12/00* (2006.01)

(52) U.S. Cl. .................................... 711/170; 711/114
(58) Field of Classification Search .................... None
See application file for complete search history.

(56) References Cited

U.S. PATENT DOCUMENTS

2006/0143508 A1*   6/2006   Mochizuki et al. ............. 714/6
2006/0161752 A1*   7/2006   Burkey ....................... 711/170

\* cited by examiner

*Primary Examiner*—Hiep T Nguyen
(74) *Attorney, Agent, or Firm*—Beck & Tysver, PLLC

(57) ABSTRACT

A method, apparatus and program storage device for providing virtual disk service hints based storage. Virtual disk service hints are provided. The virtual disk service hints are analyzed to determine a configuration model to implement. The storage system is then configured according to the configuration model identified using the virtual disk service hint.

21 Claims, 6 Drawing Sheets

| EXAMPLES OF VDS HINTS | CONFIGURATION STEPS |
|---|---|
| Change Stripe Size Of The Volume 510 512 513 514 | • Change The Stripe Side Of The Disk Group;<br>• Create A Virtual Disk Using The Disk Group With The Same Capacity And Same RAID Type; And<br>• Copy And Swap The Virtual Disk. |
| Require Fast Recovery From Crashing 520 522 524 532 | • If The Volume Is A LUN Used By The Server (Not A Plex/Mirror, i.e., A Second Copy For Redundancy):<br>  ■ Change The Raid Type Of The Virtual Disk To RAID 10.  523<br>• If The Volume Is A Plex/Mirror, I.E., A Second Copy For Redundancy:<br>  ■ Find A Remote Storage System;  525<br>  ■ Create A Virtual Disk On The Remote Storage System With The Same Capacity And Same RAID Type;  526<br>  ■ Establish A Virtual Link To The Remote Storage System; And  527<br>  ■ Copy And Swap The Virtual Disk With The Virtual Link.  528 |
| The Volume Is Mostly For Reads 540 | • Change The Raid Type Of The Virtual Disk To RAID 5 |
| Optimize The Volume For Sequential Reads 550  542 | • Change The Raid Type Of The Virtual Disk To RAID 10 |
| Optimize The Volume For Sequential Writes 560  552 | • Change The Raid Type Of The Virtual Disk To RAID 10 |
| Optimize The Volume For Large Block Sequential Access  562 | • Change The RAID Array Such That It Is Striped Over Fewer Disks Drives |

Fig. 5

METHOD, APPARATUS AND PROGRAM STORAGE DEVICE FOR PROVIDING VIRTUAL DISK SERVICE (VDS) HINTS BASED STORAGE

BACKGROUND OF THE INVENTION

1. Field of the Invention

This disclosure relates in general to configuring storage systems, and more particularly to a method, apparatus and program storage device for providing virtual disk service hints based storage.

2. Description of Related Art

Managing storage complexity is a common problem for organizations of all sizes. Businesses have undergone dramatic increases in the amount of data that they manage and therefore require greater intelligence in storage resource provisioning and management. Storage administrators continue to examine ways to expand storage capacity and provide storage management using direct attached storage and networked storage solutions. However, business managers require storage administrators to provide solutions that deliver lower costs and improved efficiency. Effective storage management is key to ensuring these solutions.

Managing networked storage—particularly storage area networks (SANs)—makes fundamentally different demands on the administrator than does managing local (directly attached) storage. Direct attached storage (DAS) causes management headaches because storage resources are tied to the servers and the distribution of those resources is difficult. Networked storage, on the other hand, consolidates storage resources, which introduces a number of management issues around the area of shared storage, including determining what storage devices are attached to the network, access to devices, and routing for fault tolerance.

Although high-end single-vendor storage management solutions for enterprise-sized organizations have been on the market for some time, increasingly sophisticated storage management tools that are designed to work with storage devices from multiple vendors have been lacking for the small and midsize business. The development of such tools can ease the complexity of storage management tasks for all businesses seeking to implement networked storage solutions.

The Microsoft® Windows® Server™ 2003 and Microsoft® Windows® Storage Server 2003 introduced two storage infrastructures/services to allow storage administrators to manage complex storage configurations (including multi-vendor configurations) more effectively, thus helping to realize the business goal of highly available data at lower cost. In particular, the Windows Virtual Disk service (VDS) is designed to address problems with disk management. VDS is a core service new to Windows Server 2003 and Windows Storage Server 2003. The VDS infrastructure is designed to provide storage administrators with a single user interface for managing multi-vendor storage at the block level. VDS provides the infrastructure used to manage storage resources, such as disks and volumes, so that directly attached and networked storage resources can be "carved up" and made available for use. VDS allows an administrator in charge of different storage arrays to centrally pull in the management of these disparate arrays within a single Windows interface and allows for the scripting of storage management activities across heterogeneous storage platforms. With VDS, disk and volume management can be centralized and scripted, thus allowing those not skilled in the storage management software to still be able to perform storage tasks such as adding a new disk to the array.

The capabilities of hardware providers depend on the capabilities of the underlying storage hardware. Therefore, the degree to which each manufacturer implements the VDS API can vary. For instance, manufacturers can implement as many of the features that are defined in the VDS API as are necessary to optimize hardware configurations, monitor and dynamically tune performance, or automate fault management. However, the configuration of storage attributes expected by applications from storage sub-systems remains complex, i.e., binding physical storage into virtual storage often requires detailed knowledge of the storage architecture in order to make the correct decisions initial creation of the storage, and even more analysis and knowledge when attempting to correct performance or fault tolerance deficiencies. Without a common (and simple) means of presenting the correct requests to a storage array to accomplish this complex configuration, most hardware providers will tend to support such a limited subset of capabilities that it becomes impossible to properly utilize the full functionality of specific storage arrays.

It can be seen then that there is a need for a method, apparatus and program storage device for providing virtual disk service hints based storage.

SUMMARY OF THE INVENTION

To overcome the limitations described above, and to overcome other limitations that will become apparent upon reading and understanding the present specification, the present invention discloses a method, apparatus and program storage device for providing virtual disk service hints based storage.

The present invention solves the above-described problems by mapping hints provided by applications to predetermined storage configurations and implementing the storage attributes according to the storage configuration identified by the hint.

A system in accordance with the principles of an embodiment of the present invention includes a configuration selection device for receiving a hint regarding virtual disk service and a storage system, coupled to the configuration selection device, for providing storage according to a configuration model, wherein the configuration selection device identifies a configuration model using the virtual disk service hint and configures the storage system according to the identified configuration model based upon the virtual disk service hint.

In another embodiment of the present invention, a database for providing virtual disk service hints based storage is provided. The database includes a list of virtual disk service hints and a plurality of configuration steps, at least one of the plurality of configuration steps being associated with a virtual disk service hint for providing operations for configuring a storage system according to a configuration model identified by a virtual disk service hint.

In another embodiment of the present invention, a method for providing virtual disk service hints based storage is provided. The method includes receiving a virtual disk service hint, identifying a configuration based upon a match of the received virtual disk service hint to available configuration models and configuring a storage system based on the identified configuration resulting from the received virtual disk service hint.

In another embodiment of the present invention, a program storage device is provided. The program storage device includes program instructions executable by a processing device to perform operations for providing virtual disk service hints based storage, the operations including receiving a virtual disk service hint, identifying a configuration based upon a match of the received virtual disk service hint to available configuration models and configuring a storage system based on the identified configuration resulting from the received virtual disk service hint.

In another embodiment of the present invention, another system for providing virtual disk service hints based storage is provided. This system includes means for receiving a hint regarding virtual disk service and means, coupled to the means for receiving, for providing storage according to a configuration model, wherein the means for receiving identifies a configuration model using the virtual disk service hint and configures the storage system according to the identified configuration model based upon the virtual disk service hint.

In another embodiment of the present invention, another database for providing virtual disk service hints based storage is provided. This database includes means for providing a list of virtual disk service hints and configuration means, associated with a virtual disk service hint, for providing operations for configuring a storage system according to a configuration model identified by a virtual disk service hint.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 5 is a table showing examples of virtual disk service hints and corresponding configurations according to an embodiment of the present invention.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing virtual disk service hints based storage. Virtual disk service hints are provided. The virtual disk service hints are analyzed to determine a configuration model to implement. The storage system is then configured according to the configuration model identified using the virtual disk service hint.

Figure 1:
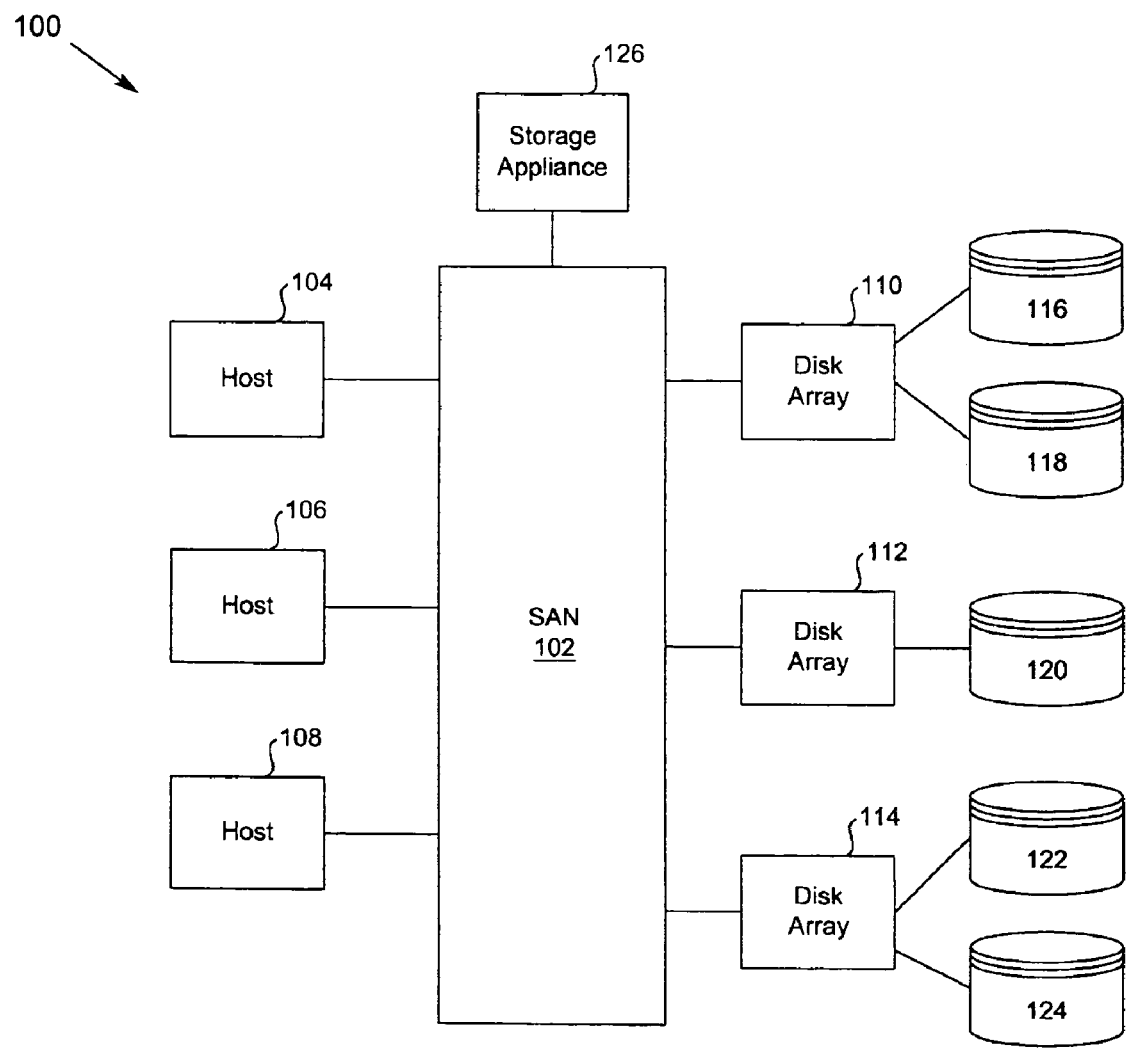
FIG. 1 illustrates a storage area network according to an embodiment of the present invention.

FIG. 1 illustrates a storage area network 100. A storage-area network is a high-speed network for interconnecting different kinds of storage devices such as tape libraries and disk arrays. These devices can be shared by all users (regardless of location or operating systems) through network servers. In FIG. 1, a storage area network 102 provides a set of hosts (e.g., servers or workstations) 104, 106, 108 that may be coupled to a pool of storage devices (e.g., disks). In SCSI parlance, the hosts may be viewed as "initiators" and the storage devices may be viewed as "targets." A storage pool may be implemented, for example, through a set of storage arrays or disk arrays 110, 112, 114. Each disk array 110, 112, 114 further corresponds to a set of disks. In this example, first disk array 110 corresponds to disks 116, 118, second disk array 112 corresponds to disk 120, and third disk array 114 corresponds to disks 122, 124. Rather than enabling all hosts 104-108 to access all disks 116-124, it is desirable to enable the dynamic and invisible allocation of storage (e.g., disks) to each of the hosts 104-108 via the disk arrays 110, 112, 114. In other words, physical memory (e.g., physical disks) may be allocated through the concept of virtual memory (e.g., virtual disks). This allows one to connect heterogeneous initiators to a distributed, heterogeneous set of targets (storage pool) in a manner enabling the dynamic and transparent allocation of storage.

The concept of virtual memory has traditionally been used to enable physical memory to be virtualized through the translation between physical addresses in physical memory and virtual addresses in virtual memory. Recently, the concept of "virtualization" has been implemented in storage area networks through various mechanisms. Virtualization converts physical storage to virtual storage on a storage network. The hosts (initiators) see virtual disks as targets. The virtual disks represent available physical storage in a defined but somewhat flexible manner. Virtualization provides hosts with a representation of available physical storage that is not constrained by certain physical arrangements/allocation of the storage.

One early technique, Redundant Array of Independent Disks (RAID), provides some limited features of virtualization. Various RAID subtypes have been implemented. In RAID 1, a virtual disk may correspond to two physical disks 116, 118 which both store the same data (or otherwise support recovery of the same data), thereby enabling redundancy to be supported within a storage area network. In RAID 0, a single virtual disk is striped across multiple physical disks. Some other types of virtualization include concatenation, sparing, etc. Some aspects of virtualization have recently been achieved through implementing the virtualization function in various locations within the storage area network. Three such locations have gained some level of acceptance: virtualization in the hosts (e.g., 104-108), virtualization in the disk arrays or storage arrays (e.g., 110-114), and virtualization in a storage appliance 126 separate from the hosts and storage pool. Unfortunately, each of these implementation schemes has undesirable performance limitations.

Virtualization in the storage array is one of the most common storage virtualization solutions in use today. Through this approach, virtual volumes are created over the storage space of a specific storage subsystem (e.g., disk array). Creating virtual volumes at the storage subsystem level provides host independence, since virtualization of the storage pool is invisible to the hosts. In addition, virtualization at the storage system level enables optimization of disk access and therefore high performance. However, such a virtualization scheme typically will allow a uniform management structure only for a homogenous storage environment and even then only with limited flexibility. Further, since virtualization is performed at the storage subsystem level, the physical-virtual limitations set at the storage subsystem level are imposed on all hosts in the storage area network. Moreover, each storage subsystem (or disk array) is managed independently. Virtualization at the storage level therefore rarely allows a virtual volume to span over multiple storage subsystems (e.g., disk arrays), thus limiting the scalability of the storage-based approach.

Figure 2:
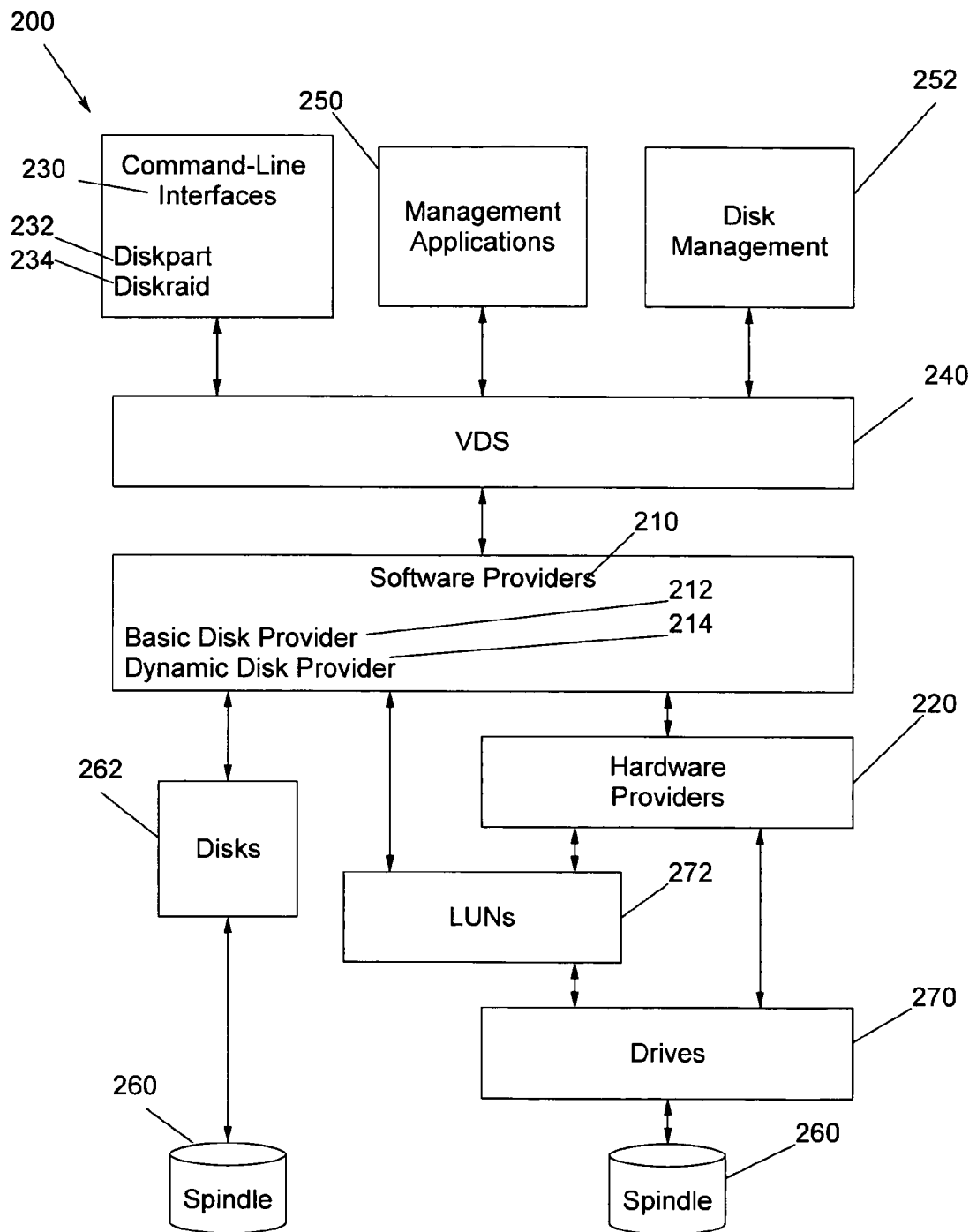
FIG. 2 illustrates a virtual disk service (VDS) architecture.

FIG. 2 illustrates a virtual disk service (VDS) architecture 200. VDS is a set of application programming interfaces (APIs) that provides a single interface for managing disks. VDS provides an end-to-end solution for managing storage hardware and disks, and for creating volumes on those disks. To manage storage devices, VDS provides a software provider 210 and a hardware provider 220.

The software provider 210 is a host-based program that is supported by a kernel-mode driver in the storage input/output (I/O) stack. The VDS software provider 210 enables disk and volume management at the operating system level. VDS-related functions are provided for the software provider 210. These are the Basic Disk Provider 212 and the Dynamic Disk Provider 214. The Basic Disk Provider 212 includes support for basic disk functionality such as partitions and volumes. The Dynamic Disk Provider 214 adds dynamic disk functionality, such as disk striping and spanning, and fault-tolerant functionality, such as RAID 5 and mirroring.

The VDS Hardware provider 220 is supplied by a hardware vendor to provide RAID arrays management. Each hardware vendor may write a VDS hardware provider 220 that translates the general-purpose VDS APIs into specific instructions for their hardware. VDS simplifies storage management because storage applications no longer need to take into account the specific hardware being targeted. Thus, different storage applications are not needed to manage each different storage device. Instead, one compatible storage application may be used to manage any hardware that has a VDS hardware provider 220.

A collection of command-line interface tools 230 is provided as command line interfaces to provide an interface to VDS. The Diskpart command-line tool 232 enables SAN functionality such as the ability to specify parameters for LUNs and to mark LUNs as inactive from the command line. Diskraid 234 is a command-line tool that lets administrators perform LUN operations (e.g., create, delete) from the command line. These tools interface directly with VDS 240 as clients and extend the manageability of storage.

Storage management applications 250 can use VDS methods to query and configure host-based disks and RAID storage. Typical storage management applications use VDS 240 to solve configuration management and monitoring problems. These applications range from dedicated storage-management systems to applications that require better control over configuration or fault management.

Disk Management 252 provides a tool for allowing a user to manage the disks. Depending on the underlying disk subsystem 260, each disk 262 can be a single physical hard disk (sometimes called a spindle 260), or it can be a group of hard drives 270 bound together at the controller level and presented to the operating system as a single disk. This type of disk is often referred to as a virtual disk or logical unit number (LUN) 272, and typically uses some form of hardware-based RAID to ensure data availability if one of the disks fails.

Figure 3:
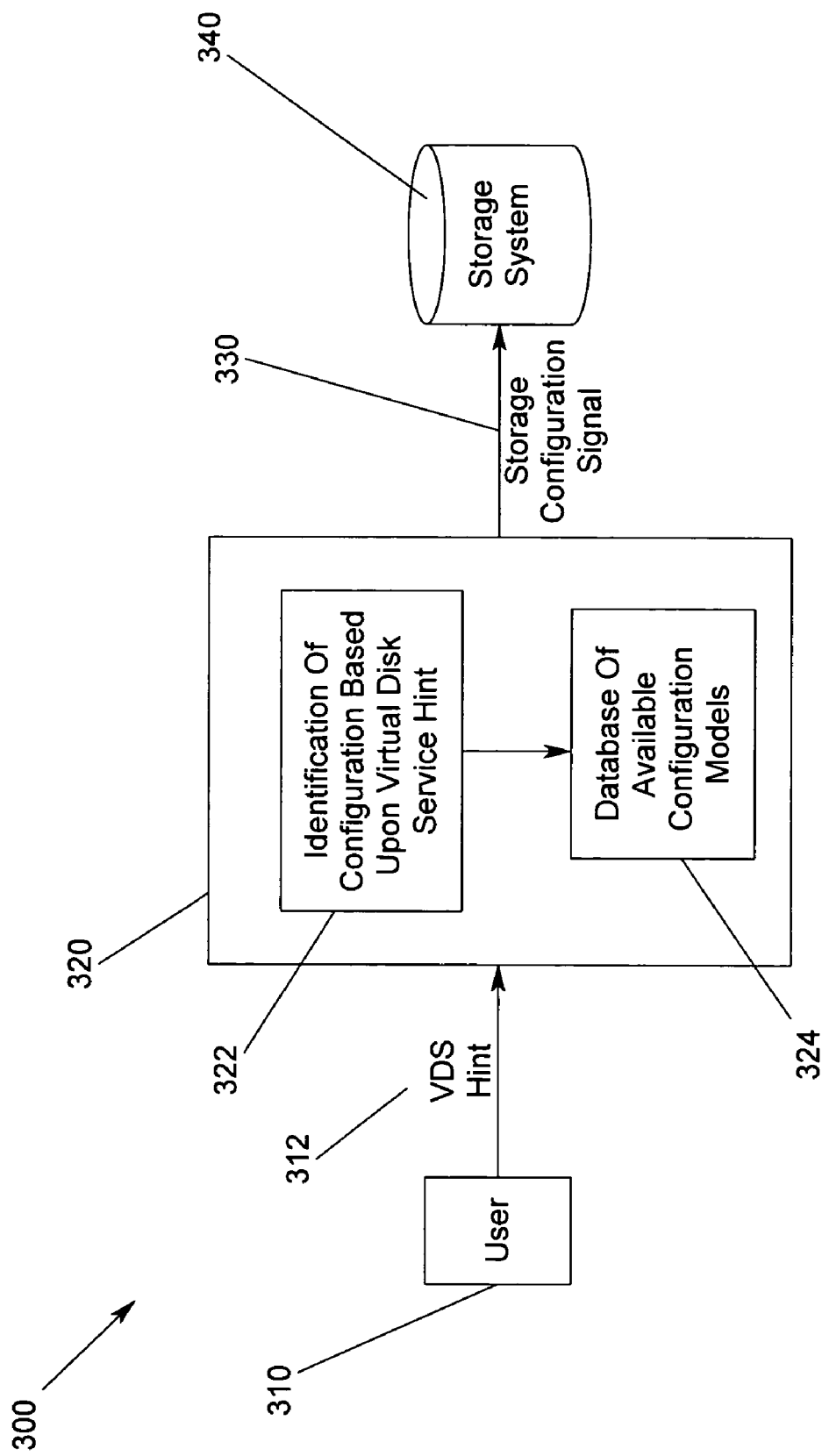
FIG. 3 illustrates a system for providing virtual disk service hints based storage according to an embodiment of the present invention.

FIG. 3 illustrates a system 300 for providing virtual disk service hints based storage according to an embodiment of the present invention. In FIG. 3, a user 310 provides virtual disk service hints 312 to a configuration selection device 320.

The configuration selection device 320 examines the virtual disk service hint received from the user and selects a configuration based upon the received virtual disk service hint. A device 322 for determining a configuration analyzes the hint and compares the virtual disk service hint to possible configuration models. A configuration type is identified by the device 322 and a configuration is selected from a database 324. The configuration selection device 320 provides a storage configuration signal 330 to a storage system 340 to direct the storage system 340 to be configured according to the configuration selected based upon the received virtual disk service hint 312.

Figure 4:
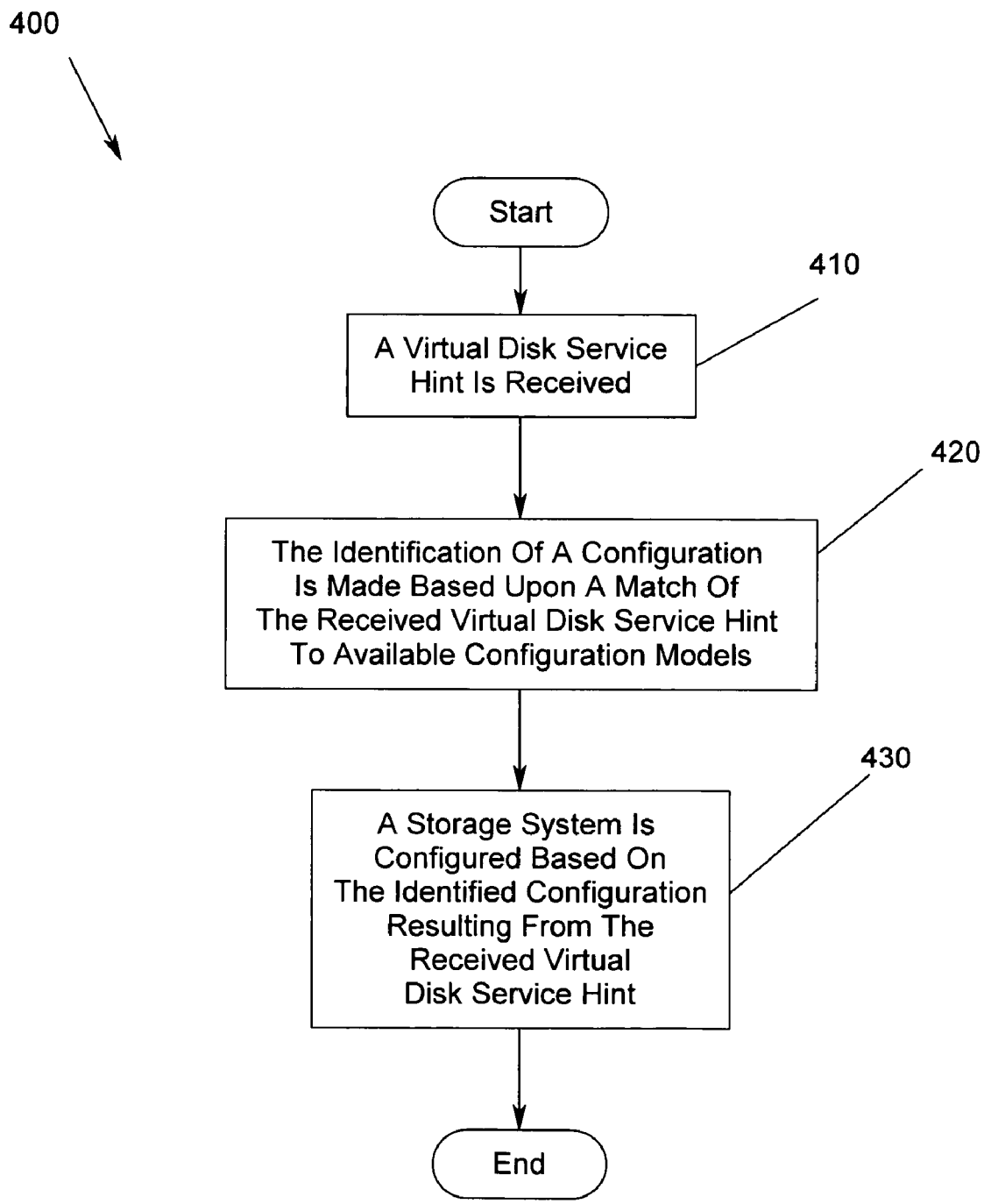
FIG. 4 is a flow chart of a method for providing virtual disk service hints based storage according to an embodiment of the present invention.

FIG. 4 is a flow chart 400 of a method for providing virtual disk service hints based storage according to an embodiment of the present invention. In FIG. 4, a virtual disk service hint is received 410. The identification of a configuration is made based upon a match of the received virtual disk service hint to available configuration models 420. A storage system is configured based on the identified configuration resulting from the received virtual disk service hint 430.

FIG. 5 is a table 500 showing examples of virtual disk service hints and corresponding configurations according to an embodiment of the present invention. In FIG. 5, the relationship between examples of virtual disk service (VDS) hints 502 and the configuration steps associated with the VDS hints 504 are shown. Those skilled in the art will recognize that the present invention is not meant to be limited to the particular examples shown, but that different examples are possible within the scope of the present invention. A first VDS hint, change stripe size of the volume 510, is associated with the configuration steps of changing the stripe size of the disk group 512, creating a virtual disk using the disk group with the same capacity and same RAID type 513 and performing a copy and swap with the virtual disk 514.

A second VDS hint, require fast recovery from crashing 520, involves determining whether the volume is a LUN used by the server (not a plex/mirror, i.e., a second copy for redundancy). If the volume is a LUN used by the server (not a plex/mirror, i.e., a second copy for redundancy) 522, the RAID type of the virtual disk is changed to RAID 10 523. If the volume is a plex/mirror, i.e., a second copy for redundancy 524, the configuration steps include finding a remote storage system 525, creating a virtual disk on the remote storage system with the same capacity and same RAID type 526, establishing a virtual link to the remote storage system 527 and performing a copy and swap of the virtual disk with the virtual link 528.

A third VDS hint, the volume is mostly for reads 530, is associated with the configuration step of changing the RAID type of the virtual disk to RAID 5 532. A fourth VDS hint, optimize the volume for sequential reads 540, is associated with the configuration step of changing the RAID type of the virtual disk to RAID 10 542. A fifth VDS hint, optimize the volume for sequential writes 550, is associated with the configuration step of changing the RAID type of the virtual disk to RAID 10 552. A sixth VDS hint, optimize the volume for large block sequential access 560, is associated with the configuration step of changing the RAID array such that it is striped over fewer disks drives 562. However, as mentioned above, additional hints and configuration steps may be provided without departing from the scope of the present invention.

Figure 6:
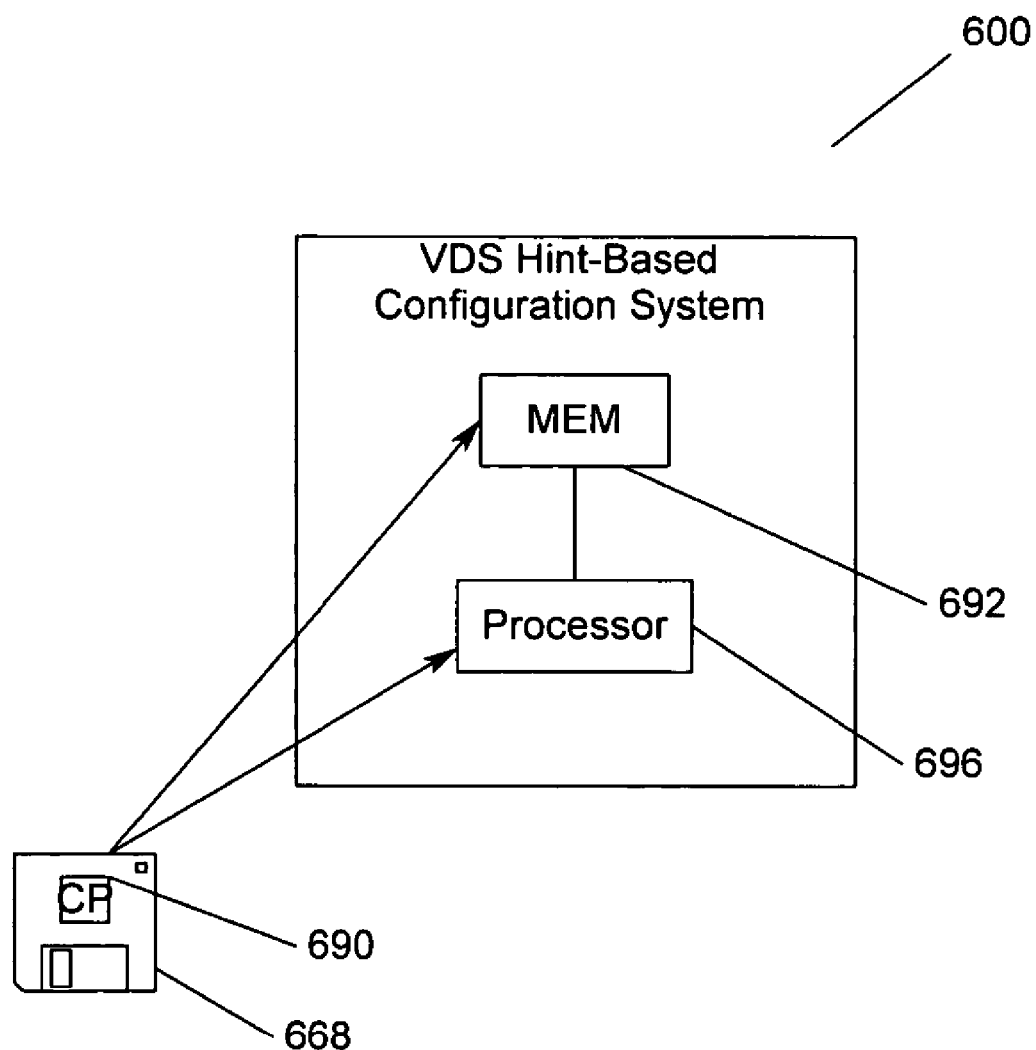
FIG. 6 illustrates a VDS hint-based configuration system and a computer-readable medium or carrier for providing operations in accordance with an embodiment of the present invention.

FIG. 6 illustrates a VDS hint-based configuration system 600 according to the present invention, wherein the process illustrated with reference to FIGS. 1-5 may be tangibly embodied in a computer-readable medium or carrier, e.g. one or more of the fixed and/or removable data storage devices 668 illustrated in FIG. 6, or other data storage or data communications devices. A computer program 690 expressing the processes embodied on the removable data storage devices 668 may be loaded into the memory 692 or into the VDS hint-based configuration system 600, e.g., in a processor 610, to configure the VDS hint-based configuration system 600 of FIG. 6, for execution. The computer program 690 comprises instructions which, when read and executed by the VDS hint-based configuration system 600 of FIG. 6, causes the VDS hint-based configuration system 600 to perform the steps necessary to execute the steps or elements of the present invention The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing virtual disk service hints based storage, comprising:
 a configuration selection device for receiving a hint regarding virtual disk service; and
 a storage system, coupled to the configuration selection device, for providing storage according to a configuration model;
wherein the configuration selection device identifies a configuration model using the virtual disk service hint and configures the storage system according to the identified configuration model based upon the virtual disk service hint.

2. The system of claim 1 further comprising a user interface for receiving a virtual disk service hint from a user.

3. The system of claim 1, wherein the configuration selection device examines the virtual disk service hint received from the user and selects a configurationbased upon the received virtual disk service hint.

4. The system of claim 1, wherein the configuration selection device further comprises:
 a determination device for analyzing the virtual disk service hint and comparing the virtual disk service hint to possible configuration models; and
 a database, coupled to the determination device, for providing configuration instructions for a plurality of configuration models associated with a matching virtual disk service hint.

5. The device of claim 1, wherein the configuration selection device provides a storage configuration signal to the storage system to direct the storage system to be configured according to the configuration selected based upon the received virtual disk service hint.

6. A database for providing virtual disk service hints based storage, comprising:
 a list of virtual disk service hints; and
 a plurality of configuration measures, at least one of the plurality of configuration measures being associated with a virtual disk service hint for providing operations for configuring a storage system according to a configuration model identified by a virtual disk service hint.

7. The database of claim 6, wherein the list of virtual disk service hints comprises a first virtual disk service hint suggesting changing stripe size of a volume of the storage system and wherein the plurality of configuration measures includes operations associated with the first virtual disk service hint, the operations including changing the stripe size of a disk group, creating a virtual disk using the disk group with a same capacity and same RAID type and performing a copy and swap with the virtual disk.

8. The database of claim 6, wherein the list of virtual disk service hints comprises a second virtual disk service hint requiring fast recovery from crashing and wherein the plurality of configuration measures includes operations associated with the second virtual disk service hint, the operations including determining whether a volume is a LUN used by the server and changing a RAID type of a virtual disk to RAID 10 when a volume is a LUN used by the server.

9. The database of claim 6, wherein the list of virtual disk service hints comprises a second virtual disk service hint requiring fast recovery from crashing and wherein the plurality of configuration measures includes operations associated with the second virtual disk service hint, the operations including determining whether a volume is a redundant copy and, when the volume is a redundant copy,
 finding a remote storage system,
 creating a virtual disk on the remote storage system with the same capacity and same RAID type,
 establishing a virtual link to the remote storage system and performing a copy and swap of the virtual disk with the virtual link.

10. The database of claim 6, wherein the list of virtual disk service hints comprises a third virtual disk service hint suggesting a volume is mostly for reads and wherein the plurality of configuration measures includes operations associated with the third virtual disk service hint, the operations including changing a RAID type of a virtual disk to RAID 5.

11. The database of claim 6, wherein the list of virtual disk service hints comprises a fourth virtual disk service hint suggesting optimizing a volume for sequential reads and wherein the plurality of configuration measures includes operations associated with the fourth virtual disk service hint, the operations including changing a RAID type of a virtual disk to RAID 10.

12. The database of claim 6, wherein the list of virtual disk service hints comprises a fifth virtual disk service hint suggesting optimizing a volume for sequential writes and wherein the plurality of configuration measures includes operations associated with the fifth virtual disk service hint, the operations including changing a RAID type of a virtual disk to RAID 10.

13. The database of claim 6, wherein the list of virtual disk service hints comprises a sixth virtual disk service hint suggesting optimizing a volume for large block sequential accesses (typical of backup operations) and wherein the plurality of configuration measures includes operations associated with the fifth virtual disk service hint, the operations including changing a RAID such that it is striped over fewer physical disks or a specific number of physical disks depending on the system performance.

14. A method for providing virtual disk service hints based storage, comprising:
 receiving a virtual disk service hint;
 identifying a configuration based upon a match of the received virtual disk service hint to available configuration models; and
 configuring a storage system based on the identified configuration resulting from the received virtual disk service hint.

15. The method of claim 14, wherein the identifying a configuration based upon a match of the received virtual disk service hint to available configuration models further comprises:
 analyzing the received virtual disk service hint;

comparing the virtual disk service hint to possible configuration models; and identifying a configuration model matching the virtual disk service hint.

16. The method of claim 14, wherein the configuring a storage system based on the identified configuration resulting from the received virtual disk service hint further comprises sending a storage configuration signal to a storage system to direct the storage system to be configured according to the configuration selected based upon the received virtual disk service hint.

17. A program storage device, comprising:

a digital medium containing program instructions executable by a processing device to perform operations for providing virtual disk service hints based storage, the operations comprising:

receiving a virtual disk service hint;

identifying a configuration based upon a match of the received virtual disk service hint to available configuration models; and configuring a storage system based on the identified configuration resulting from the received virtual disk service hint.

18. The program storage device of claim 16, wherein the identifying a configuration based upon a match of the received virtual disk service hint to available configuration models further comprises:

analyzing the received virtual disk service hint;

comparing the virtual disk service hint to possible configuration models; and identifying a configuration model matching the virtual disk service hint.

19. The program storage device of claim 16, wherein the configuring a storage system based on the identified configuration resulting from the received virtual disk service hint further comprises sending a storage configuration signal to a storage system to direct the storage system to be configured according to the configuration selected based upon the received virtual disk service hint.

20. A system for providing virtual disk service hints based storage, comprising:

means for receiving a hint regarding virtual disk service; and means, coupled to the means for receiving, for providing storage according to a configuration model;

wherein the means for receiving identifies a configuration model using the virtual disk service hint and configures the storage system according to the identified configuration model based upon the virtual disk service hint.

21. A database for providing virtual disk service hints based storage, comprising:

means for providing a list of virtual disk service hints; and configuration means, associated with a virtual disk service hint, for providing operations for configuring a storage system according to a configuration model identified by a virtual disk service hint.

* * * * *

UNITED STATES PATENT AND TRADEMARK OFFICE
CERTIFICATE OF CORRECTION

PATENT NO. : 7,406,578 B2
APPLICATION NO. : 11/241176
DATED : July 29, 2008
INVENTOR(S) : Burkey et al.

It is certified that error appears in the above-identified patent and that said Letters Patent is hereby corrected as shown below:

Column 1, Line 50, after "Windows" insert --®--

Column 1, Line 52, after "to Windows" insert --®--

Column 1, Line 52, after "and Windows" insert --®--

Column 1, Line 61, after "single Windows" insert --®--

Column 2, Line 12, after "decisions" insert --for--

Column 7, Line 5, delete "610" and insert --696--

Column 7, Line 38, after "configuration" insert a space

Signed and Sealed this

Twenty-second Day of December, 2009

David J. Kappos
*Director of the United States Patent and Trademark Office*